Oct. 22, 1957 D. G. C. LUCK 2,810,779

COLOR TELEVISION SYSTEMS

Filed Feb. 1, 1951 7 Sheets-Sheet 1

INVENTOR
David G. C. Luck
BY
ATTORNEY

INVENTOR
David G. C. Luck
BY
[signature]
ATTORNEY

INVENTOR
David G. C. Luck
BY [signature]
ATTORNEY

INVENTOR
David G. C. Luck
BY
[signature]
ATTORNEY

Oct. 22, 1957 D. G. C. LUCK 2,810,779

COLOR TELEVISION SYSTEMS

Filed Feb. 1, 1951 7 Sheets-Sheet 5

INVENTOR
David G. C. Luck
BY
[signature]
ATTORNEY

INVENTOR
David G. C. Luck
BY
[signature]
ATTORNEY

COLOR TELEVISION SYSTEMS

Filed Feb. 1, 1951 7 Sheets-Sheet 7

INVENTOR
David G. C. Luck
BY
ATTORNEY

United States Patent Office 2,810,779

Patented Oct. 22, 1957

2,810,779

COLOR TELEVISION SYSTEMS

David G. C. Luck, Princeton, N. J., assignor to Radio Corporation of America, a corporation of Delaware Application February 1, 1951, Serial No. 208,944

27 Claims. (Cl. 178—5.2)

This invention relates to color television systems including transmitters and receivers.

In a dot multiplex color television system, the transmitted signal successively represents the intensities of the component colors employed as each line of a raster is being scanned. Thus, in a three-color system the transmitted modulation signal might successively be comprised of samples of red, green and blue video signals. It has previously been determined that the theoretical maximum number of fully independent, separately recoverable samples that can be transmitted per second is equal to twice the cut-off frequency of the video band available. Thus, if a transmission system has 4.2 megacycles available for video transmission, a total of 8.4 million separate samples of the color signals can be recovered per second. In a dot multiplex system having 4.2 megacycles available for the transmission of video information and wherein three component colors are employed, 2.8 million independent samples may be seen each second for each color.

The number of samples of the video signals that are recoverable each second, together with the number of images reproduced per second, determines the fineness of the detail that may be reproduced in the transmitted image. Therefore, in order to increase the available detail, attempts have been made to increase the number of samples conveyed per second to a point beyond the maximum for which the samples can be fully independent. As long as the amplitude of the samples of each color remains unchanged, although the samples corresponding to the different colors may be of different amplitudes, no undesirable effects are produced in the image no matter how much the sampling rate is increased as long as signals at the sampling rate itself can be transmitted. This is also true for conditions wherein the amplitudes of the samples corresponding to each of the different colors do not change at a rate above a certain predetermined frequency. However, if the difference in amplitude of successive samples of a single color channel becomes large, the recovered samples are no longer independent of one another, the signals are no longer individually separable, and therefore inaccurate color reproduction occurs in the transmitted image.

It is difficult to visualize the exact type of deterioration that is produced in the image by increasing the sampling rate beyond the maximum when the problem is approached from the point of view of sampling techniques. However, a clearer impression as to the results produced is obtained when the problem is approached from a point of view of modulation techniques wherein a sub-carrier wave of sampling frequency is considered to be modulated by the video signals representing the different colors. Suffice it to say that the modulation of the sub-carrier produces, as is well known to those skilled in the art, two frequencies for each video frequency, one frequency being equal to the sum of the sub-carrier frequency and the video frequency, and the other frequency being equal to the difference between the sub-carrier frequency and the video frequency.

It is well established that each side band can carry a separate portion of the information. When, for example, the subcarrier is modulated with the signals representing color information, the products of the modulation process represent two different characteristics of the color, one of them being hue and the other being chroma. Both side bands must be transmitted if the hue and chroma are to be faithfully reproduced at a receiver. Now if the video frequency $V_f$ should be 3 megacycles and the sampling frequency, $F_s$=3.8 megacycles, and the cut-off frequency, $F_{co}$=4.2 megacycles, the lower side band equals the difference between $F_s$ and $V_f$ which is 0.8 megacycles and is transmitted. However, the upper side band equals the sum of $F_s$ and $F_f$ and in this case equals 6.8 megacycles. This latter frequency is greater than 4.2 megacycles and therefore is not transmitted. As a result of the loss of this side band the color represented by the transmitted signal is not correct for the selected frequency of 3 megacycles. On the other hand, a video frequency of 0.1 megacycles produces side bands of 3.7 megacycles and 3.9 megacycles both of which lie within the band of frequencies conveyed by the transmitter. Therefore, color variations of 0.1 megacycles are faithfully transmitted. A video frequency of 3.7 megacycles produces side bands of 0.1 megacycles and 7.5 megacycles. The latter side band lies beyond the cut-off frequency of 4.2 megacycles of the transmitter and at first it would seem that the information in this side band would be lost. However, the sub-carrier generally has a second harmonic of 7.6 megacycles. When this second harmonic is modulated with the video frequency of 3.7 megacycles, two additional side bands are created, one of which is the sum of 7.6 megacycles and 3.7 megacycles and the other of which is their difference. The sum is obviously beyond the cut-off frequency of 4.2 megacycles and is therefore not transmitted, whereas, the difference frequency is 7.6—3.7=3.9 megacycles, a frequency that lies below the upper cut-off frequency of the transmitter. The side band derived from the second harmonic of the sampling frequency permits both hue and chroma of the color to be faithfully represented by the signals. A mathematical exposition as to the precise reasons for these statements may be found in the United States patent application of W. H. Cherry, Serial No. 160,664, filed May 8, 1950.

Applying these principles to the above numerical example, the following general results are obtained. If the video passband is cut off at a frequency of $F_{co}$, which in the above numerical example was 4.2 megacycles, and the sampling rate $F_s$ for any individual color is set at 3.8 megacycles, all the information in the video signals having a frequency below a predetermined frequency of 0.4 megacycles, which equals the difference between the cut-off frequency $F_{co}$ and the sampling frequency $F_s$, may be transmitted without deterioration. Likewise, a band of video frequencies lying between 3.4 megacycles and 3.8 megacycles or between $(2F_s-F_{co})$ and $F_s$ is transmitted without deterioration. The upper side band of frequencies lying between $(F_{co}-F_s)$, which in this numerical example is 0.4 megacycles, and $(2F_s-F_{co})$, which in this case is 3.4 megacycles, is lost in transmission. This latter example corresponds to the case in which the amplitude of the individual samples of any one given color change too rapidly and would result in incorrect information in the transmitted wave if utilized. And for this reason, this frequency region is sometimes referred to as the cross-talk region.

It is therefore an object of this invention to provide improved color television systems including transmitters and receivers wherein the mid-range of video frequencies is transmitted without deterioration to any significant degree. Another object of the invention is to provide an improved transmitter capable of conveying color signals lying in a video frequency band between ($2F_s—F_{co}$) and ($F_{co}—F_s$) without significant deterioration of the image, where $F_s$ is the sampling frequency and $F_{co}$ is the cut-off frequency.

Still another object of the invention is to provide a receiver capable of reproducing the portion of the image represented by color video signals lying in a video frequency band between ($2F_s—F_{co}$) and ($F_{co}—F_s$) without significant deterioration.

A still further object of the invention is to provide improved means for deriving and utilizing samples of video color signals that represent two colors in the cross-talk regions and three colors in the cross-talk free regions, the samples of the two colors in the cross-talk regions being uniformly spaced.

It has been determined that the eye is partially color blind when observing small areas. Therefore, in accordance with one of the features of this invention, apparatus is provided for transmitting only that color information which the eye can use when the image is comprised of suitably small areas.

In small areas the eye can distinguish between red and blue-green far better than it can distinguish between yellow and blue. This conclusion has been reached through experiments wherein individuals have been able to match all colors on small areas when these areas are illuminated by red and blue-green lights only. However, as the size of the area is increased, the eye requires that the areas be matched by illumination with light comprised of at least three component primary colors. For the very finest detail that can be seen, the eye is substantially color blind, and sees only varying degrees of brightness.

Finest detail in a televised image is represented by high video frequencies, small areas in the image are represented by mid-range video frequencies and large areas are represented by low frequencies. If the sampling frequency $F_s$ is properly selected with respect to the cut-off frequency of the video pass-band of a television transmission system, then the cross-talk region of frequencies lying between 3.4 megacycles=($2F_s—F_{co}$) and 0.4 megacycles=($F_{co}—F_s$) may be made to substantially correspond with the mid-frequency region in which the eye is partially color blind. Two-color transmission preferably in red and blue-green in this frequency region is therefore adequate to satisfy the eye.

In accordance with this invention, therefore, novel means are provided for transmitting three-color information in the region below ($F_{co}—F_s$) and between ($2F_s—F_{co}$) and $F_s$ and two-color information in the region lying below a predetermined frequency ($2F_s—F_{co}$) and above a frequency ($F_{co}—F_s$), where $F_{co}$ is the cut-off frequency and $F_s$ is the sampling frequency.

The video information lying in the mid-frequency range between ($2F_s—F_{co}$) and ($F_{co}—F_s$) is transmitted at a sampling rate that does not exceed the maximum video frequency value and therefore all the samples are fully independent. Hence, no deterioration of the image is produced, and the reduction from three colors to two is not visually significant.

In accordance with another aspect of this invention, each sample taken of video information lying below the predetermined frequency of ($F_{co}—F_s$) represents only one of the three primary component colors which may be chosen as red, green or blue, while each sample taken of the mid-range video information is such as to represent only one of two primary components preferably blue-green and red.

In accordance with another feature of this invention, the finest detail in the image is represented by a monochromatic yellow that is derived from a mixture of the red and green video signals. Reduction to a single color for such detail is again not visually significant, and causes no noticeable deterioration of the image.

Thus it can be said that the low frequency video signals that reproduce the large areas are transmitted trichromatically, the mid-range video signals representing small areas are transmitted bi-chromatically and the highest range video signals representing fine detail are transmitted mono-chromatically.

A video signal can be thought of as being generally comprised of an alternating-voltage component that is superimposed onto a direct-voltage component. The video signal may then be considered as one which varies both positively and negatively with respect to the direct-voltage component that is positive with respect to a reference voltage. During the negative excursions of the alternating-voltage component, the video signal is generally still positive with respect to the reference voltage due to the large positive value of the direct-voltage component. However, in some receivers embodying the principles of this invention, the direct-voltage component is reduced to zero and negative voltage excursions result. A sampling of the negative voltage component produces samples of negative potential. In some receivers these negative voltage samples are applied so as to directly modulate the intensity of the electron beam in a kinescope. Generally, the beam intensity is adjusted so that the black level of an applied signal causes the beam to attain an intensity just slightly less than that required to cause the beam to reproduce light in the phosphor screen that it strikes. Thus, if the reference level referred to above is the same as the black level, the negative voltage variations of the samples of video signal cannot be reproduced.

In accordance with another feature of this invention means are provided for effectively reproducing the information represented by samples of the alternating component of a signal that have a negative value with respect to the black or reference level.

This latter feature may be accomplished by shifting the phase of the samples of certain low frequency information including the direct-voltage component so that they properly occur at the same time as the samples of the alternating component of the video signal. Thus, when a sample of the latter signal is negative with respect to the black or reference level, it is added to the positive sample of the direct-voltage component and the resultant of these two voltages may have a positive value. The low-frequency and direct-voltage components of the signal represent the large areas in the image. The high-frequency alternating-voltage components define the edges of this large area and the small areas of the picture where intensity of color changes rapidly. Thus, unless proper phasing of the samples of the low-frequency components with respect to the samples of the high-frequency components is maintained, changes in the relative position of the large areas with respect to the small areas of the image will result. If this change in position is sufficiently small, it is not noticeable. This is especially true if the change in relative position involves a single color, as the eye's acuity for a single color is not as great as it is for brightness.

The novel manner in which the objectives of this invention may be attained will be better understood from a detailed consideration of the drawings in which.

Figure 1:
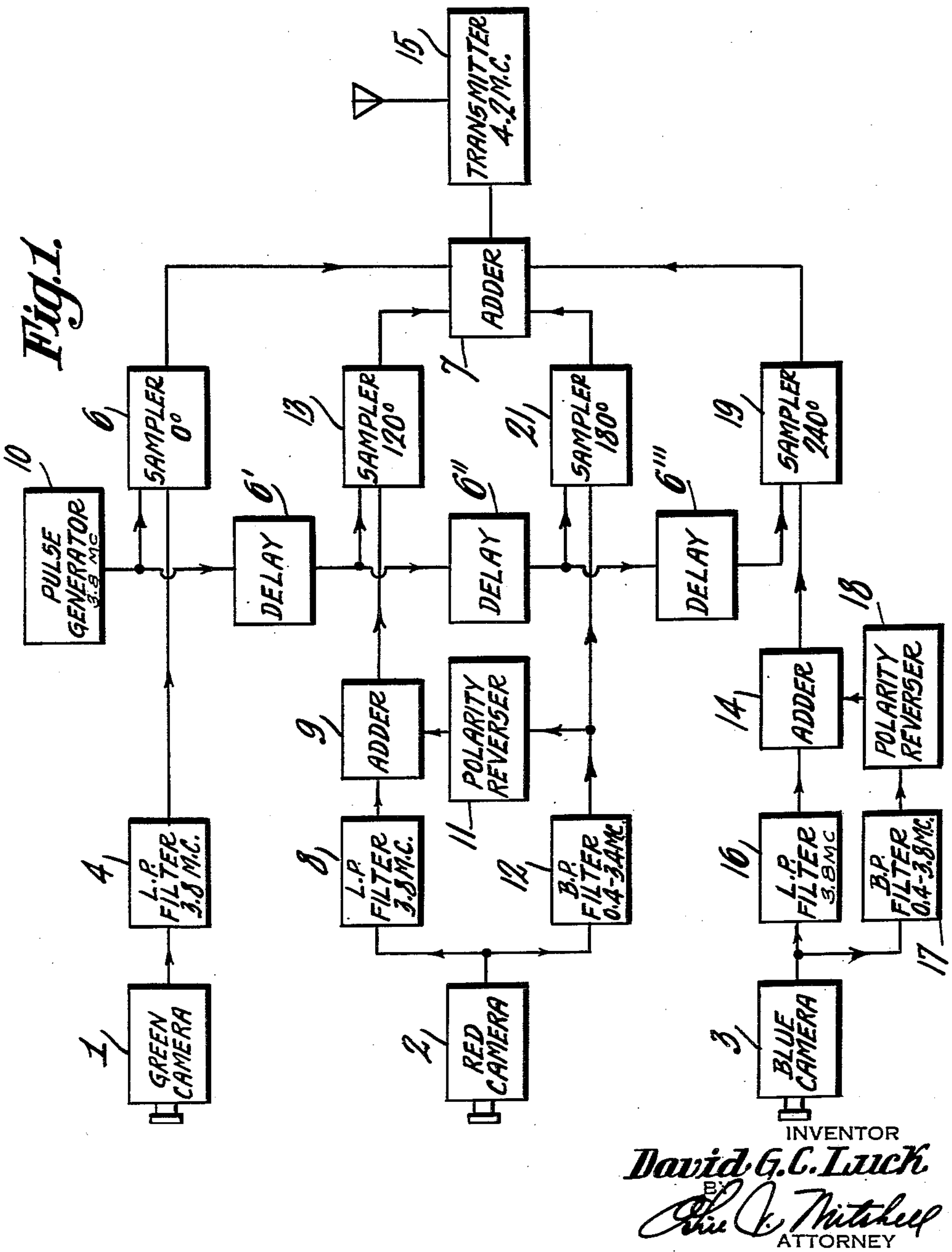
Figure 1 represents in block diagram form a transmitter adapted to combine the video signals representing the different component colors in such a manner that the low-frequency range is represented tri-chromatically and the mid-range of video frequency is transmitted bi-chromatically.

Referring now in detail to Figure 1, there is shown a television transmitter constructed in accordance with the principles of this invention. Green, red and blue video signals are provided by the television cameras 1, 2, and 3 respectively. The green video signals lying below the sampling frequency $F_s$ are passed via a low-pass filter 4, a sampler 6, to an adder 7. The sampler 6 bears the label 0° as it is to be the one to which the phase of operation of the other samplers is to be related. As used in this invention, each of the samplers may, for example, be a gated amplifier that is rendered capable of passing signals during selected periods of time. The red video signals lying below the sampling frequency $F_s$ are passed by a low-pass filter 8 to an adder 9. The red video signals lying between $(F_{co}-F_s)$ and $(2F_s-F_{co})$ are supplied to a polarity reverser 11 via a suitable band-pass filter 12. The output of the polarity reverser 11 is also applied to the adder 9, so that the output of the adder 9 is limited to frequencies lying below $(F_{co}-F_s)$ or between $(2F_s-F_{co})$ and $F_s$. These frequencies are applied to the adder 7 via a 120° sampler 13. The 120° signifies that this sampler extracts a sample of red video information one third of a cycle of the sampling frequency $F_s$ later than the 0° sampler 6. The blue video signals lying below the frequency $F_3$ are applied to an adder 14 via a low-pass filter 16. The video signals lying between $(F_{co}-F_s)$ and $(2F_s-F_{co})$ are applied to the adder 14 via a band-pass filter 17 and a polarity reverser 18. Thus, only the blue video signals lying below the frequency $(F_{co}-F_s)$ are supplied via a 240° sampler 19 to the adder 7.

The samplers 6, 13, 21, and 19 may be gate circuits that are successively rendered capable of passing signals applied to them by the pulses of sampling frequency that are supplied by the pulse generator 10. These pulses are suitably delayed by delay lines 6', 6'', and 6''' so as to key the sampler 13 after a time delay equal to one third of the interval between pulses, the sampler 21 after a time delay equal to one half the time between pulses and the sampler 19 after a time delay equal to two thirds of the time between pulses.

It can be seen that in this particular arrangement the green, red, and blue video signals lying below the frequency $(F_{co}-F_s)$ or between $(2F_s-F_{co})$ and $F_s$ are sampled at 120° intervals of the sampling frequency with respect to one another and applied to the adder 7. It is also possible to have the samplers 6, 13, and 19 operating at different phases or at different angles than 120° with respect to one another rather than perform their sampling operations during uniformly spaced intervals.

It has been previously stated that the mid-range of frequencies lying between $(F_{co}-F_s)$ and $(2F_s-F_{co})$ are to be transmitted in two colors only. The following details relate to how this may be accomplished. The red video signals lying within this mid-frequency range are supplied by the band-pass filter 12 to the adder 7 via a 180° sampler 21. It will be noted that the blue video signals lying within this mid-frequency range do not reach the adder 7, and therefore the video information within this frequency range is limited to green and red. As will become apparent from a discussion of other figures in the drawings, other pairs of colors may be selected for transmission within this mid-frequency range. However, it may be desirable to select red and green in view of the fact that the eye's acuity for these two colors is greater than it is for blue.

The output of the adder 7 containing all the sampling information is applied via any suitable transmission means, which may be a cable or a radio energy link having a video pass-band cut off at a frequency of $F_{co}$. As will be understood by those skilled in the art, the cut-off frequency can be determined at the transmitter or at the receiver, but it is normally done at both.

It will be understood that the filters in the transmitter are to be designed so that all time delays between the cameras and the adder 7 are the same.

Figure 1A:
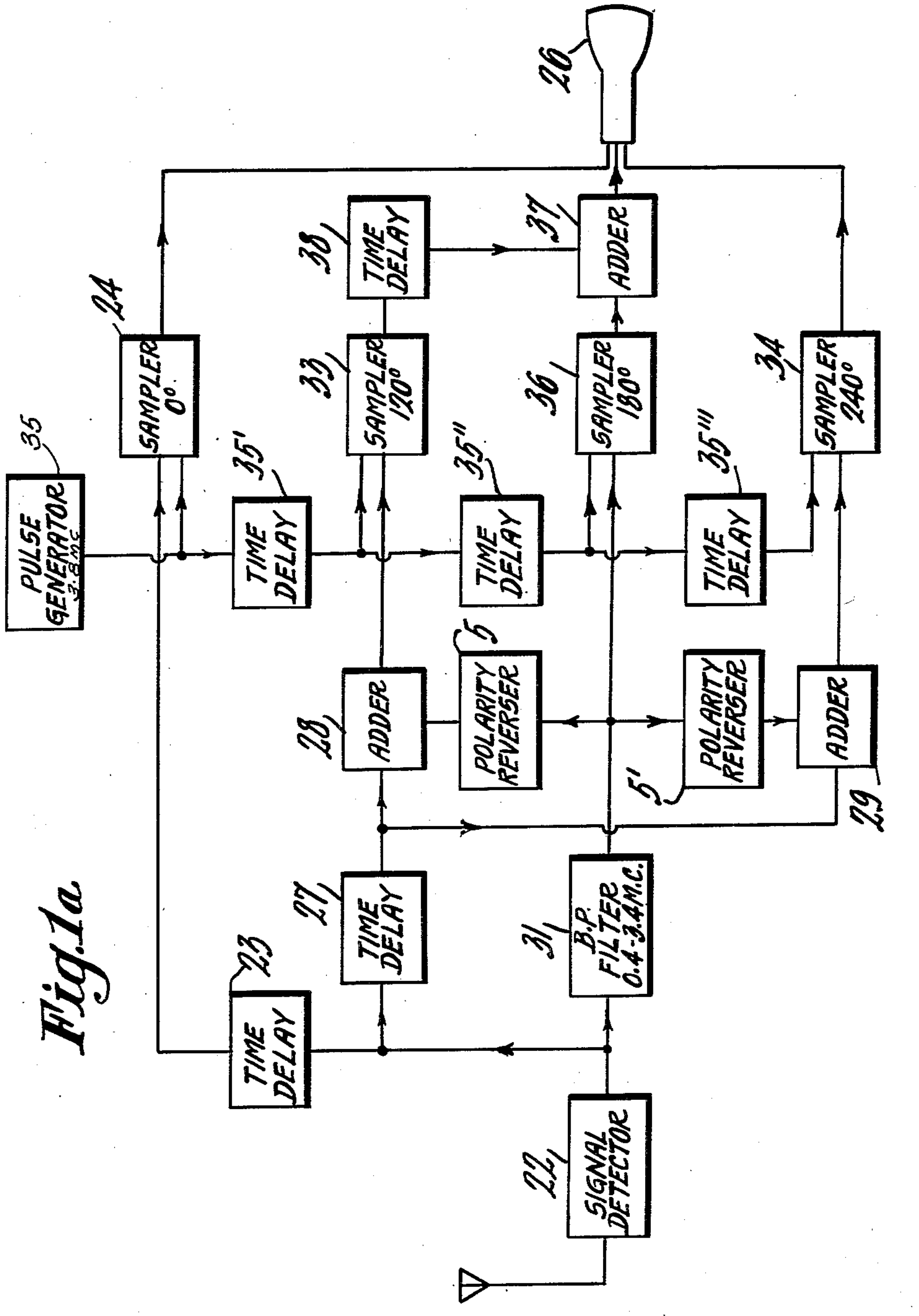
Figure 1A illustrates in block diagram form a receiver that is adapted to reproduce images from the signals such as transmitted by the transmitter in Figure 1.

Figure 1A illustrates a receiver adapted to reproduce colored images from the signals such as are conveyed by the transmitter in Figure 1. After these signals have been detected in a signal detector 22, they are applied via a time delay line 23 and a 0° sampler 24 to a portion of means 26 that is adapted to reproduce the green light in the transmitted image. The output of the signal detector 22 is also applied via a time delay means 27 to the inputs of adders 28 and 29 as well as to the input of a band-pass filter 31 having the same time delay as the time delay means 27, and also having pass-band frequency limits of $(F_{co}-F_s)$ and $(2F_s-F_{co})$, which define the mid-frequency range. The output of the band-pass filter 31 is applied to each of the adders 28 and 29 via polarity reverser units 5 and 5'. The outputs of the adders 28 and 29, that are applied to the 120° sampler 33 and the 240° sampler 34, respectively, therefore contain only frequencies lying below $(F_{co}-F_s)$. The output of the 240° sampler 34 is applied to the portion of the means 26 that is adapted to reproduce the blue information in the image.

The output of the band-pass filter 31 is also supplied to a 180° sampler 36. The output of the 180° sampler 36 is applied to an adder 37. The output of the 120° sampler 33 is delayed, by an amount equal to 60° at the sampling frequency, in a time-delay network 38, so that the samples arriving at the adder 37 from this time-delay network coincide with the samples provided by the 180° sampler 36 to the adder 37. The output of the adder 37 is then applied to a portion of the means 26 that is adapted to reproduce the red part of the image.

The samplers are similar to those employed in the transmitter and are keyed by suitably delayed pulses from the pulse generator 35 and the delay lines 35', 35'', and 35'''. The pulse generator 35 at the receiver may be synchronized with the pulse generator 10 at the transmitter by any well known means.

The reason for the time delays 23, 27, and 38 will now be explained. The time-delay networks 23 and 27 are inserted as shown so as to compensate for delay experienced by the signals being passed through the band-pass filter 31. If such precautions were not taken, the signal appearing in the output of the band-pass filter 31 would not be in phase with the signals supplied to the adders 28 and 29, and therefore a proper subtraction in the adders 28 and 29 could not be performed. This would mean that portions of unwanted frequency information lying within the mid-frequency band would pass through the adders 28 and 29.

Due to the fact that light reproducing means are generally unable to reproduce negative light, it is necessary that any negative samples provided by the 180° sampler 36 be subtracted from the positive samples supplied by the 120° sampler 33. In order to do this, the samples supplied by the 120° sampler 33 must be delayed by 60° so that they occur at the same time as the samples in the output of the sampler 36.

The samples supplied by the sampler 33 represent the low-frequency components of the red portion of the image because at this same relative time, the sampler 13 of Figure 1 is passing low-frequency red information to the transmitter. The change in the time of occurrence or phase of these samples provided by the delay network 38 therefore shifts the red portion of the image with respect to the other portions of the image. However, this shift is so small that it produces no harmful defects. The edge of a large red area is defined by the high-frequency components provided by the 0° sampler 24 and the 180° sampler 36.

Thus, in the mid-frequency range lying between $(F_{co}-F_s)$ and $(2F_s-F_{co})$ only the samplers 24 and 36 supply information to the reproducing means 26. Those samples transmitted at a 240° phase and corresponding to the blue video information are confined to a low-frequency region of the video spectrum lying below the predetermined frequency $(F_{co}-F_s)$, together with a region from $(2F_s-F_{co})$ to $F_s$. In this way, the low-frequency portion of each of the video signals is supplied to the reproducing means 26 at phase determined by the phases of samplers 24, 33, and 34, and the time-delay 38. The mid-range frequencies are applied at 180° intervals to the reproducing means 26 by the samplers 24 and 36 respectively.

Figure 2:
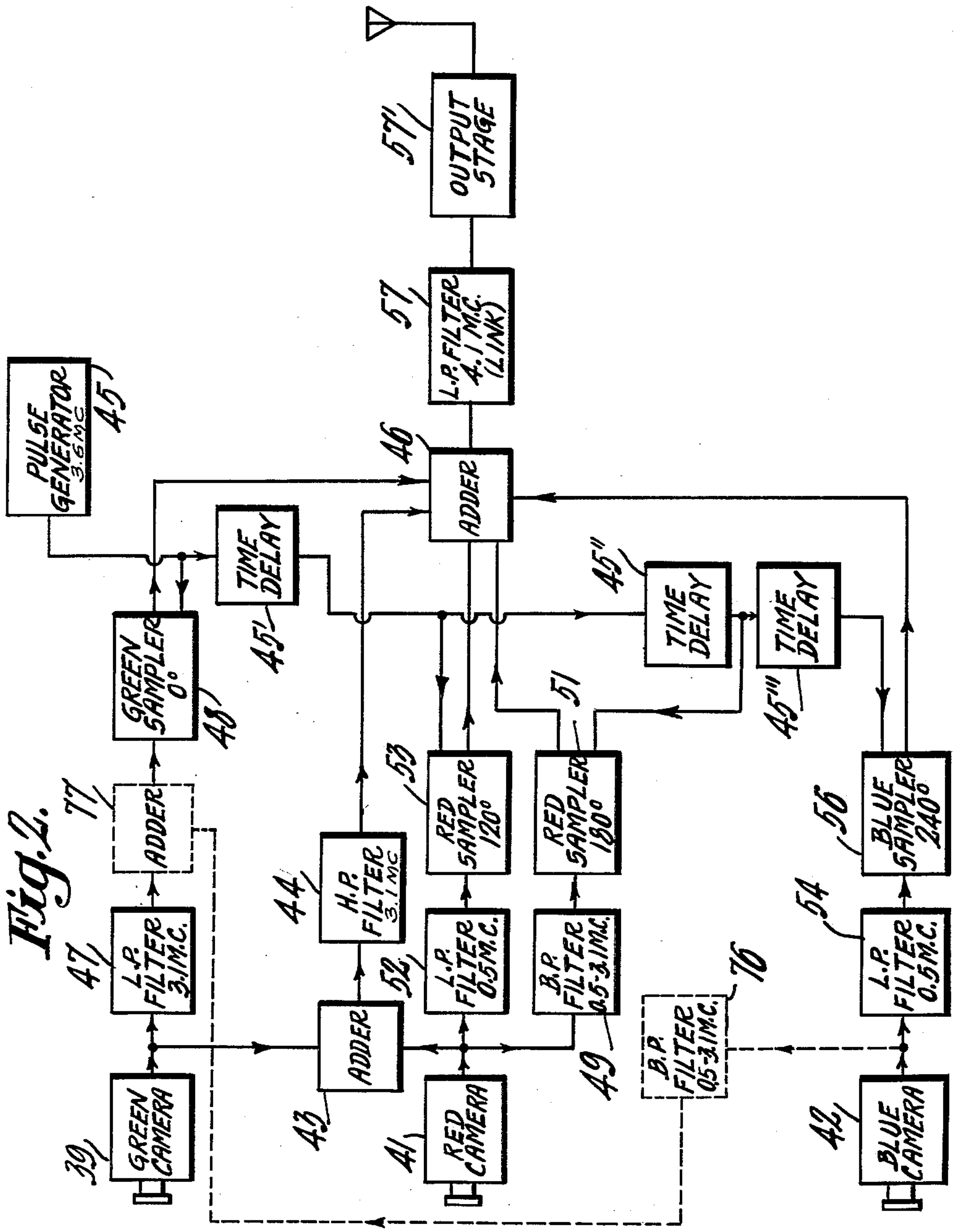
Figure 2 illustrates in block diagram form a transmitter wherein the low-frequency video signals are transmitted tri-chromatically, and the mid range video frequencies are transmitted bi-chromatically, and the fine detail is transmitted monochromatically.

Figure 2 illustrates another type of transmitter that may be employed to derive signals in accordance with the principles of this invention, wherein the mid-range portion of the image is again represented by two component colors only. In this example, the video signal passband cutoff frequency $F_{co}$ is assumed to be 4.1 megacycles and the sampling frequency $F_s$ is assumed to be 3.6 megacycles. The green, red, and blue video signals are supplied by cameras 39, 41, and 42 respectively. Those green and red video signals lying above the frequency $(2F_s-F_{co})$, above the mid-frequency range, are combined in an adder 43 and applied through a band-pass filter 44 to an output adder 46. The green video signals limited to an upper frequency of $(2F_s-F_{co})$ by a low-pass filter 47 are applied via a zero-phase sampler 48 to the adder 46. The mid-range band of frequencies appearing in the output of the red camera 41 are selected by a band-pass filter 49 and applied via a 180° sampler 51 to the adder 46. Those red video frequencies lying below the frequency $(F_{co}-F_s)$ are applied via a low-pass filter 52 to a 120° sampler 53 and thence to the adder 46. The blue video signals are limited to a frequency equal to $(F_{co}-F_s)$ by a low-pass filter 54 and are supplied to the adder 46 via a 240° sampler 56. The output of the adder 46 is limited to $F_{co}$, which in the numerical example is 4.1 megacycles. These signals are then transmitted by any known means 57'.

The samplers may be simple gate circuits that are triggered at appropriate times by suitably delayed pulses provided by the pulse generator 45 and the delay lines 45', 45'', and 45'''.

The operation of the transmitter in Figure 2 will now be explained. The low video frequencies representing large areas of the image and lying below the frequency $(F_{co}-F_s)$ are applied to the adder 46 via the samplers 48, 53, and 56, which in this example operate during uniformly spaced intervals occurring every 120° of the sampling frequency. As far as the low video frequencies are concerned, this operation is similar to the dot sequential television systems of the prior art.

However, the mid-frequency range lying between $(F_{co}-F_s)$ and $(2F_s-F_{co})$ and representing the small areas in the image are confined to two colors, green and red. The green video signals lying within this mid-frequency range are supplied by the 0° sampler 48 whereas the red video signals lying within this same mid-frequency range are supplied by a 180° sampler 51. The blue video frequencies in this range do not reach the adder 46 due to the action of the low-pass filter 54. Therefore, the red and green video signals lying within this range are sampled at 180° intervals of the sampling frequency. This means that fewer samples of video frequencies lying within this mid-frequency range are transmitted. Loss of one side-band for signals in this range results in some reduction in signal strength. While not shown, it should be understood that a compensating boost of video levels in this frequency range may be provided.

In order to transmit the fine detail of the image in monochromy, the outputs of the green and red cameras 39 and 41 respectively are combined in an adder 43. The output of the adder 43 is limited to frequencies lying above the mid-range of frequencies, namely those frequencies lying above the frequency $(2F_s-F_{co})$, which in fine detail is indistinguishable from white, by the high-pass filter 44. The mixed red and green forms monochromatic yellow and is combined with the rest of the signal in the adder 46.

Figure 2A:
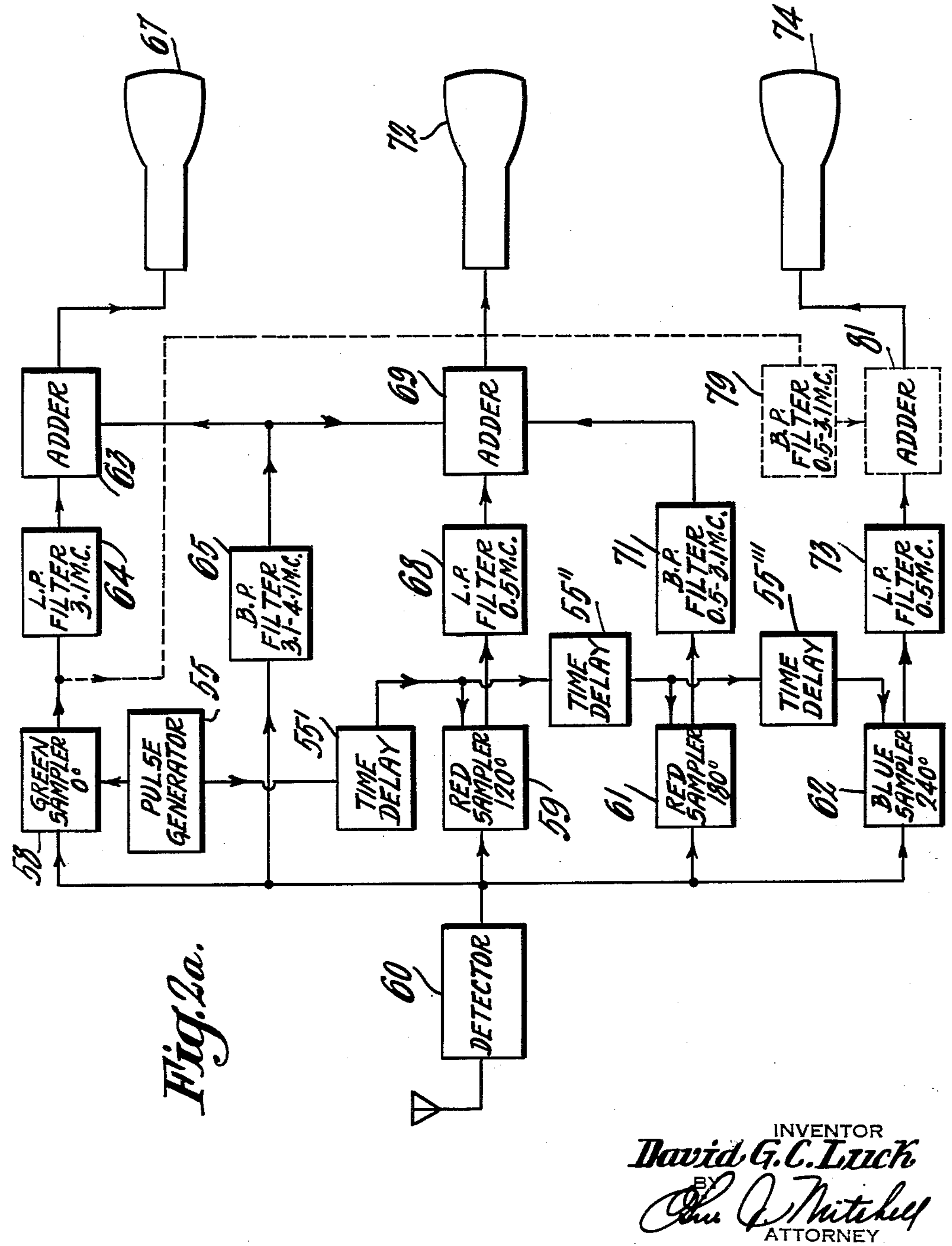
Figure 2A illustrates also by block diagram a receiver adapted to reproduce images from a transmitter such as shown in Figures 2 or 3.

The details of the receiver of Figure 2A are as follows. After detection in a detector 60, the signals are applied to a 0° sampler 58, a 120° sampler 59, a 180° sampler 61, and a 240° sampler 62. The samplers are triggered by suitably delayed pulses from the pulse generator 55 and the appropriate delay lines 55', 55'', and 55'''. The detected signals are also supplied to a high-pass filter 65 having a lower limit of $(2F_s-F_{co})$. Alternatively, the filter 65 may be a bandpass filter as indicated with a similar lower frequency limit and an upper frequency limit of $F_{co}$. The output of the 0° sampler 58 is supplied to an adder 63 via a low-pass filter 64 having its upper limit set at a frequency of $(2F_s-F_{co})$. The output of the high-pass filter 65 is also applied to the adder 63. The output of the adder 63 is applied to means 67 for reproducing the green portion of the image.

The output of the 120° sampler 59 is limited to frequencies below $(F_{co}-F_s)$ that represent large areas by a low-pass filter 68 and is applied to an adder 69. The output of the high-pass filter 65 is also applied to the adder 69. The output of the 180° sampler 61 is limited to the mid-frequency range having limits of $(F_{co}-F_s)$ and $(2F_s-F_{co})$ by a band-pass filter 71. These frequencies appearing in the output of the band-pass filter 71 are then applied to the adder 69. The output of the adder 69 is then applied to a means 72 for reproducing the red portion of the image.

The output of the 240° sampler 62 is limited to the frequencies below the pre-determined frequencies $(F_{co}-F_s)$ by a low-pass filter 73 and is supplied to a means 74 for reproducing the blue portion of the image.

The overall operation of the receiver of Figure 2A is as follows. The outputs of the 0° sampler 58, the 120° sampler 59, and the 240° sampler 62 contain the low frequencies that represent the large areas in the picture. These low frequencies are applied to the reproducing means 67, 72, and 74 respectively. Because the green low frequency information was sampled in the 0° sampler 48 in the transmitter in Figure 2, the output of the 0° sampler 58 in Figure 2A represents the green information. For similar reasons, the output of the 120° sampler 59 represents the red video signals and the output of the 240° sampler 62 represents the blue video signals. The video signals lying in the mid-frequency range between the frequencies of $(F_{co}-F_s)$ and $(2F_s-F_{co})$ are also passed through the 0° sampler 58 to the green reproducing means 67. In addition, they are passed by the 180° sampler 61 to the red reproducing means 72. Thus, this range of frequencies representing the small areas in the picture is sampled at a lower rate than the low-frequency portion of the video spectrum, and is reproduced in the two colors red and green.

The fine detail of the image was represented at the transmitter by red and green signals that were combined in the adder 43 of Figure 2 and were restricted to frequencies above $(2F_s - F_{co})$. These same signals are selected by the high-pass filter 65 and applied to the green and red reproducing means 67 and 72 respectively. In view of the fineness of detail represented by these high frequencies, the yellow produced by these reproducing means is indistinguishable from white.

As previously noted, the eye's color acuity for the small areas represented by the mid-frequency range between the limits $(F_{co} - F_s)$ and $(2F_s - F_{co})$ is better able to distinguish between blue-green and red than it is between any other two colors. Therefore, the arrangement shown in Figure 2 may be altered as indicated by the dotted structure so that the two colors transmitted in the mid-frequency range representing the small areas of the image are red and blue-green. To accomplish this, the output of the blue camera 42 is supplied to a band-pass filter 76 that selects the mid-range of frequencies. The output of the band-pass filter 76 is applied to an adder 77, which is inserted in series with and between the low-pass filter 47 and the 0° sampler 48. Thus, the output of the 0° sampler 48 in the mid-frequency range is a combination of blue and green so as to give a signal determined by the blue-green portions of the subject rather than one which represents purely green. The 180° sampler 51 provides the red information to the adder 46 as before, so that during the mid-frequency range alternate samples are supplied by the 0° sampler 48 representing blue-green, and by the 180° sampler 51 representing red.

In order to reproduce the blue-green information in the mid-frequency range, the receiver of Figure 2A may have added to it the dotted structure as shown. The output of the green sampler 58 is now the same as the modified output of the green sampler 48 in the transmitter of Figure 2 and, therefore, contains combined blue and green information at frequencies in the mid-range. These frequencies are applied to a band-pass filter 79 and combined with the low-frequency blue information in an adder 81. The output of the adder 81 is applied to the means 74 for reproducing blue. Thus, the video frequencies lying in the mid-frequency range are applied to both the means for producing the green portion of the image 67 and the means for producing the blue portion of the image 74, so reproducing such signals in blue-green light.

Figure 3:
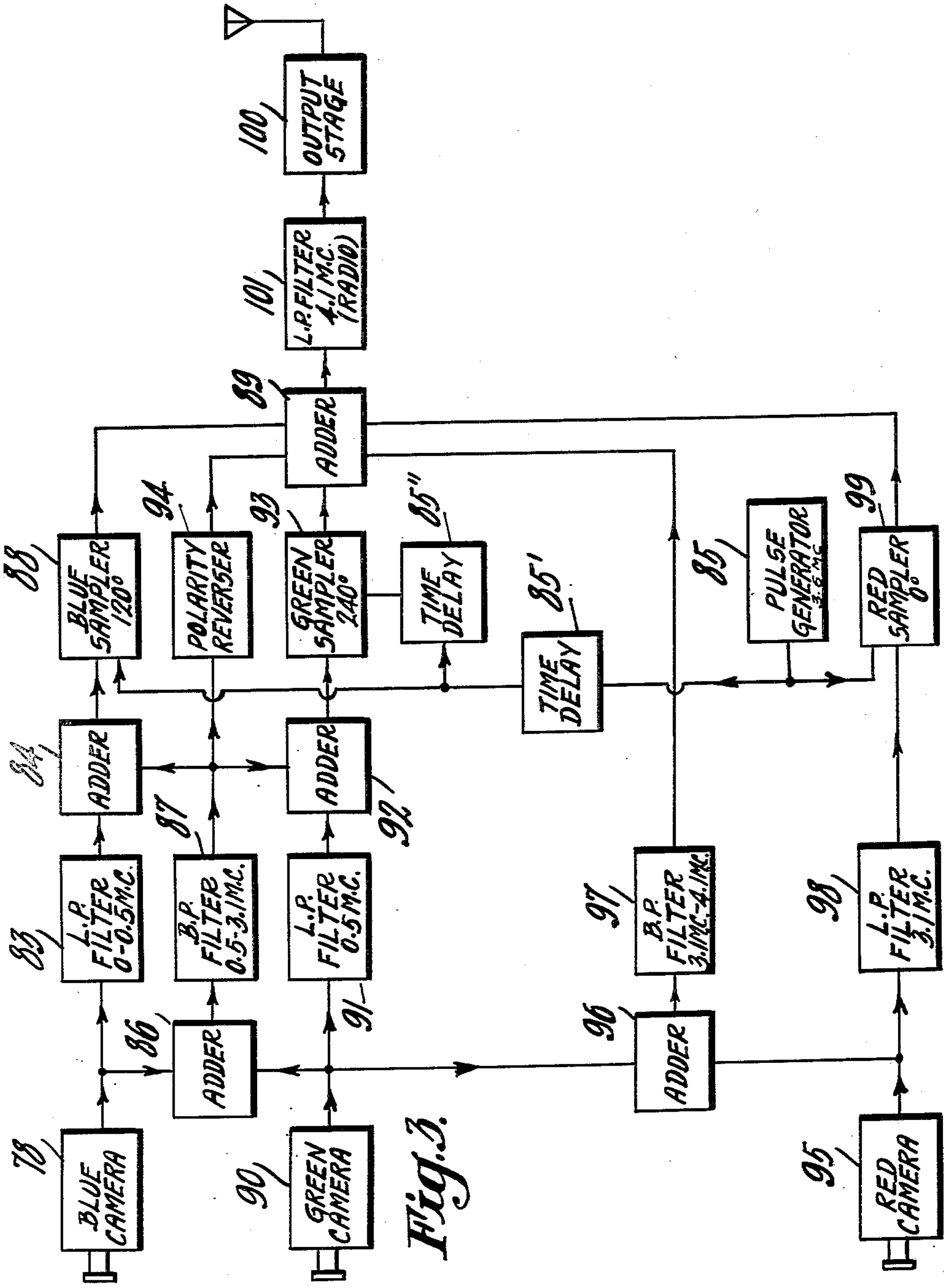
Figure 3 illustrates in block diagram form an alternative transmitter system wherein the low-frequency video signals are transmitted tri-chromatically, the mid-range video signals are transmitted bi-chromatically, the two colors being blue-green and red, and the fine detail is transmitted as a monochromatic yellow.

Figure 3 illustrates an alternative form of transmitter of the type wherein the low frequencies representing the large areas of an image are transmitted tri-chromatically, the mid-frequency range representing the small areas is transmitted bi-chromatically and the fine detail is transmitted monochromatically. In this example, the video signal passband cutoff frequency $F_{co}$ is assumed to be 4.1 megacycles and the sampling frequency $F_s$ is assumed to be 3.6 megacycles. This particular arrangement differs from the one shown in Figure 2 in that the 180° samples of the video information in the mid-frequency range are obtained by combining the outputs of a 120° sampler and a 240° sampler in a suitable fashion rather than having an extra 180° sampler. The samplers are gate circuits triggered by suitably delayed pulses from the pulse generator 85 and appropriate delay lines 85′ and 85″. The blue, green, and red video signals are provided by any suitable television cameras 78, 90, and 95 respectively. The output of the blue video camera 90, limited to frequencies below $(F_{co} - F_s)$ by a low-pass filter 83, is supplied to an adder 84. Both the green video signals from the camera 90 and the blue video signals from the camera 78 are added in an adder 86 and applied to the adder 84 via a band-pass filter 87 having the limits of the mid-frequency range namely $(F_{co} - F_s)$ and $(2F_s - F_{co})$. The output of the adder 84 is sampled by a 120° sampler 88 and its output in turn is applied to an adder 89.

The green video signal components lying below $(F_{co} - F_s)$ are supplied via a low-pass filter 91 to an adder 92. The mid-frequencies supplied by the band-pass filter 87 are also supplied to the adder 92. The output of the adder 92 is sampled in a 240° sampler 93 before being supplied to the adder 89.

The output of the band-pass filter 87 is also supplied to the adder 89 via a polarity reverser 94 for reasons that will become apparent upon the discussion of the overall operation of the transmitter.

The green and red video signals are combined in an adder 96 and the high frequencies representative of the fine detail in the image and lying above a frequency of $(2F_s - F_{co})$ are passed to the adder 89 via a high-pass filter 97. Alternatively, the filter 97 may be a passband filter as indicated with a similar lower frequency limit and an upper frequency limit of $F_{co}$.

The red video signals lying below the frequency $(2F_s - F_{co})$ that lies at the upper end of the mid-frequency region are passed by a low-pass filter 98 to a 0° sampler 99 and then to the adder 89.

The output of the adder 89 representing the totality of the signal inputs to this element is then transmitted by any suitable link 100 to a receiver. The fact that the link has a cut-off frequency of $F_{co}$ is indicated by the low-pass filter 101.

The overall operation of the transmitter of Figure 3 is as follows. The red, blue and green low-frequency information is supplied successively in the order named to the adder 89 by the samplers 99, 88, and 93 respectively. This much of the transmitter is known in the prior art of dot sequential transmission.

The red video information lying in mid-frequency range and representing the small areas in the picture is also passed by the 0° sampler 99 to the adder 89. As the eye can best distinguish between red and blue-green, as previously discussed in connection with the dotted structure of Figures 2 and 2A, the mid-frequency ranges of the combined blue and green camera outputs are selected by the adder 86 and the band-pass filter 87. This combined information is applied to the 120° sampler 88 and also to the 240° sampler 93. The vectorial addition of these combined samples of green and blue produces a resultant that is 180° out of phase with the mid-frequency range red information supplied to the adder 89 by the 0° sampler 99. These resultant samples of the green and blue mid-frequency video information and the samples of the red mid-frequency video information are thus uniformly spaced and occur twice during each sampling cycle.

When a signal is sampled by sharp pulses, the direct current component of these pulses beats with the frequencies applied to the sampler and reproduces these frequencies directly. The 120° sampler 88 and the 240° sampler 93 provide such components thus, and they are additive. In other words, the direct video component of the information supplied to the adder 89 would be twice that in the original image. In order to overcome this, the output of the band-pass filter 87 is reversed in polarity in the polarity reverser 94 and applied to the adder 89. In accordance with principles known to those skilled in the art, the amplitude of this inverse video input to the adder 89 may be equal to the direct video component provided by either one of the samplers 88 and 93. Thus, the direct video component emerging from the adder 89 is reduced by half of what it would have been were it not for the reverser 94, and therefore is restored to its proper amplitude level.

Figure 3A:
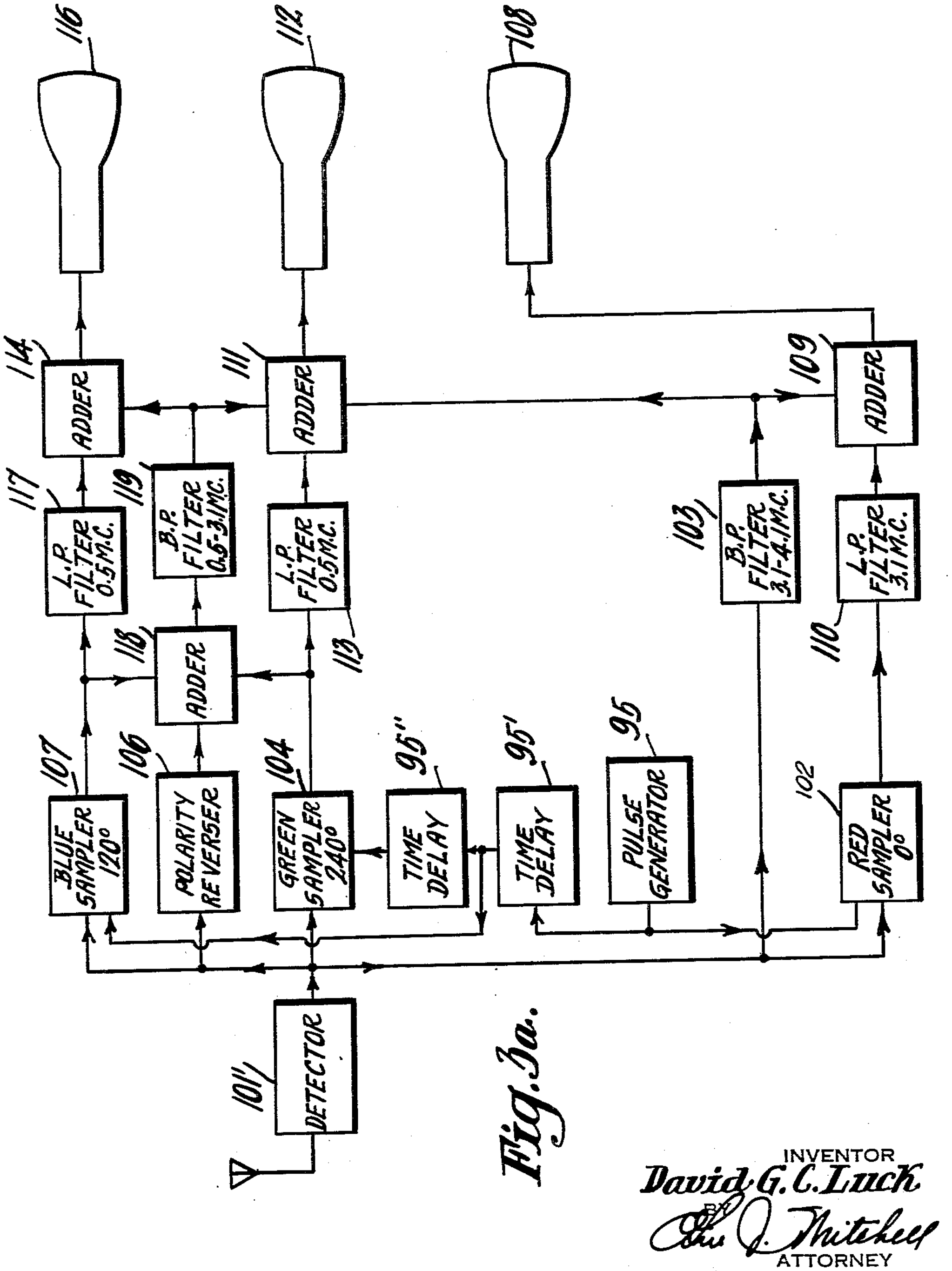
Figure 3A illustrates in block diagram form an alternative receiver adapted to operate in conjunction with the transmitter described in Figure 2 or 3.

The following relates to the receiver shown in Figure 3A. After the signals such as supplied by the adder 89 of Figure 3 have been detected and have been limited in frequency by the low-pass filter 101 that symbolically represents the video bandwidth restriction of the system, they may be detected by a detector 101′ and applied to a 0° sampler 102, a band-pass filter 103, a 240° sampler 104, a polarity reverser 106 and a 120° sampler 107, as shown in Figure 3A. The samplers are triggered by pulses from a pulse generator 95 after they have been suitably delayed by delay lines 95' and 95''. The output of the 0° sampler 102 is limited to the upper frequency $(2F_s—F_{co})$ of the mid-frequency range by a low-pass filter 110 and applied to a means 108 for reproducing the red portion of the image via an adder 109. The high frequency range of frequencies supplied by the band-pass filter 103 is applied to the means for reproducing the red portion of the image 108 via the adder 109. It is also supplied via an adder 111 to means 112 for reproducing the green portion of the image. This produces the brightness detail in yellow but in such small areas that yellow is indistinguishable from white.

Those green video signal frequencies lying below the lower limit $(F_{co}—F_s)$ of the mid-frequency range are selected by the low-pass filter 113 and are supplied via the adder 111 to the means for reproducing the green portion of the image 112.

The low-frequency portion of the output of the 120° sampler 107 is supplied via a low-pass filter 117 and an adder 114 to means 116 for reproducing the blue portion of the image.

The output of the polarity reverser 106 and the outputs of the 240° sampler 104 and the 120° sampler 107 are combined in an adder 118. Those frequencies in the output of the adder 118 lying in the mid-frequency range are supplied by a band-pass filter 119 to each of the adders 111 and 114.

The overall operation of the receiver of Figure 3A is as follows. Turning again to the low-frequency information in each of the colors, it will be apparent that the red lows are supplied by the 0° sampler 102 to the reproducing means 108; that the green lows are supplied by the 240° sampler 104 to the green reproducing means 112; and that the blue lows are transmitted via the 120° sampler 107 to the blue reproducing means 116.

The manner in which the mid-frequency portion of the video spectrum is reproduced is as follows. All of the frequencies supplied by the 120° sampler 107 are supplied to the adder 118 and all of the frequencies supplied by the output of the 240° sampler 104 are supplied to the adder 118. In addition, all the frequencies supplied by the adder 89 in the transmitter of Figure 3 are reversed in polarity and are therefore subtracted from the combined blue and green signals in the adder 118. As was stated above, in connection with the transmitter of Figure 3, the video signals are modulated by the D.-C. component of the sharp pulse samples derived from the samplers 104 and 107 and would normally provide too much D.-C. The polarity reverser 106 operates in a manner similar to polarity reverser 94 in the transmitter of Figure 3, so as to reduce this D.-C. component by one half. Whereas the inputs to the adder 118 might alternatively have been restricted to frequencies in the mid-frequency band, this would require more filters than simply placing a single filter 119 in the output of the adder 118. Thus, the blue-green mid-frequency signal supplied by the band-pass filter 119 is supplied via adders 111 and 114 to both the green reproducing means 112 and the blue reproducing means 116 so as to form a blue-green color in this frequency range.

The video frequencies lying in the mid-frequency range of the outputs of the 120° sampler 107 and the 240° sampler 104 will appear in the output of the adder 118 as a blue-green signal and represent the output of an 180° sampler provided with blue-green signals. Thus, the number of samples reproduced in the mid-frequency range is only two for each cycle of sampling frequency instead of three as in the case of the low-frequency range.

In order to obtain monochromatic fine detail, the video frequencies lying above the mid-frequency range, notably those lying above the frequency $(2F_s—F_{co})$ are applied to both the green reproducing means 112 and the red reproducing means 108 by the high-pass filter 103. Thus, the fine detail in the image is reproduced in yellow. However, due to the eye's color blindness in the high frequencies, it does not distinguish this yellow from white.

Figure 4:
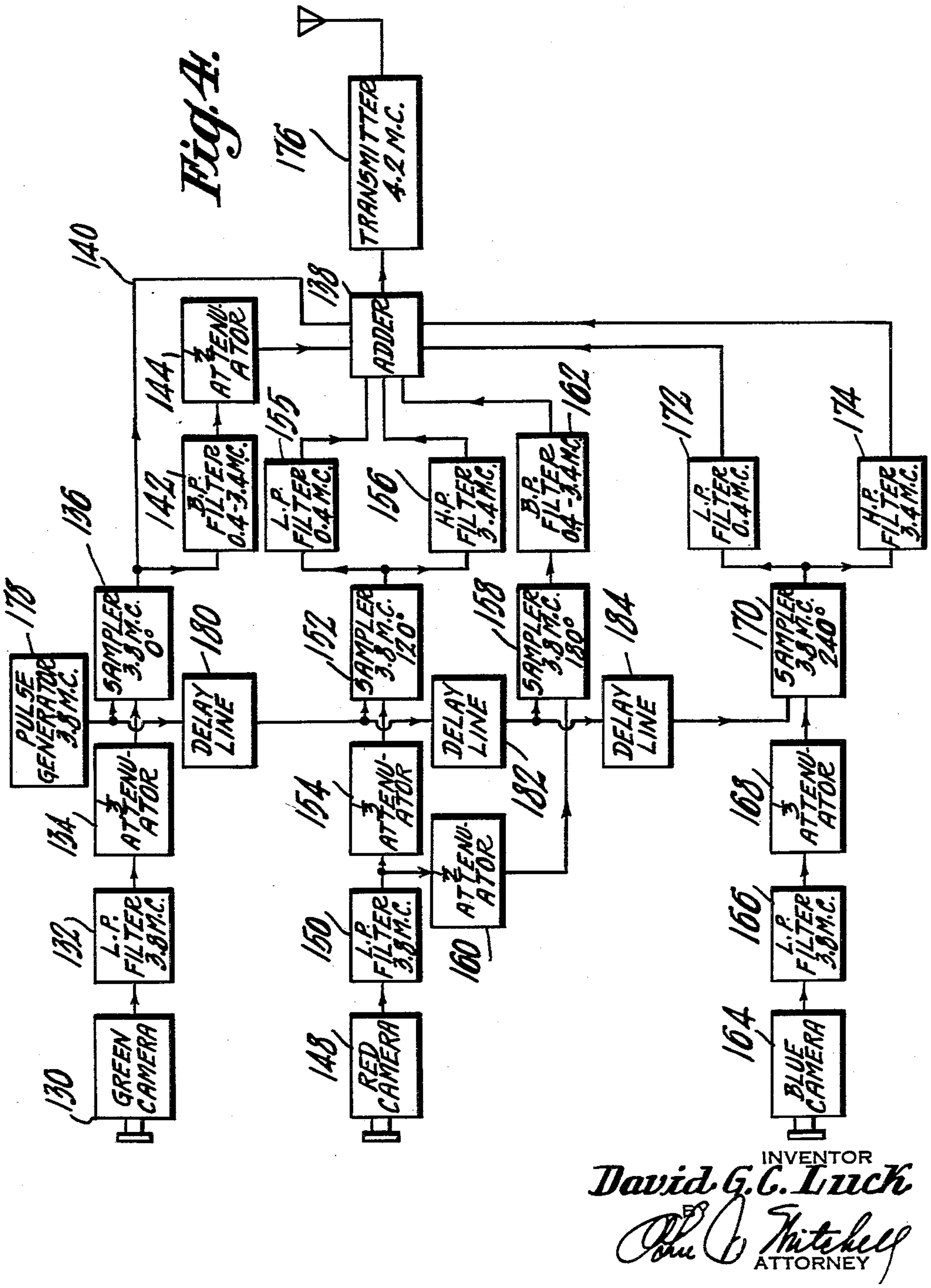
Figure 4 shows a modified transmitter.

Figure 4 illustrates an alternative way in which the principles of this invention may be incorporated into a transmitter, wherein the amplitude levels of the different bands of frequencies are properly adjusted and wherein some of the filtering is done after the sampler as well as before. The transmitter is similar to that shown in Figure 1, but it will be understood that the principles hereinafter discussed are equally applicable to the other transmitters employing the principles of this invention. In this example, the video signal passband cutoff frequency $F_{co}$ is assumed to be 4.2 megacycles and the sampling frequency $F_s$ is assumed to be 3.8 megacycles.

The video signals representing the green portion of the image are supplied by a camera 130 and are applied via a lowpass filter 132 and an attenuator 134 to a 0° sampler 136. The output of the sampler 136 is supplied directly to an adder 138 by a lead 140. The output of the sampler 136 is also supplied to the adder 138 via a band-pass filter 142 having a lower limit of $(F_{co}—F_s)$ megacycles and an upper limit of $(2F_s—F_{co})$ megacycles, and an attenuator 144. The attenuator 134 reduces the amplitude of the signals supplied to it by a factor of 3, and the attenuator 144 reduces the signals applied to it by a factor of 2.

The red video signals are supplied by the camera 148 to a low-pass filter 150. The output of the low-pass filter 150 is applied to a 120° sampler 152 via an attenuator 154 that reduces the signals applied to it by a factor of 3. The output of the sampler 152 is applied to a low-pass filter 155 having an upper frequency limit of $(F_{co}—F_s)$ and a high-pass filter 156 having a lower frequency limit of $(2F_s—F_{co})$. The outputs of the low-pass filter 155 and the high-pass filter 156 are applied to the adder 138.

The output of the low-pass filter 150 is also applied to a 180° sampler 158 via an attenuator 160 that reduces the signals applied to it by a factor of 2. The output of the sampler 158 is applied to the adder 138 via a band-pass filter 162 having a lower frequency limit of $(F_{co}—F_s)$ and an upper frequency limit of $(2F_s—F_{co})$.

The blue video signals are supplied by a camera 164. After passing through a low-pass filter 166 and an attenuator 168, that reduces the signals by a factor of 3, the reduced blue video signals are applied to a 240° sampler 170. The output of the 240° sampler 170 is applied to two filters, a low-pass filter 172, having an upper frequency limit of $(F_{co}—F_s)$, and a high-pass filter 174, having a lower frequency limit of $(2F_s—F_{co})$. The output of the filters 172 and 174 are applied to the adder 138. The output of the adder 138 is then applied to a transmitting means 176, a low-pas device having a cut-off frequency of $F_{co}$.

A pulse generator 178 supplies keying pulses at a rate of $F_s$ cycles directly to the sampler 136. After suitable delay in means 180, corresponding to 120° of phase at frequency $F_s$, these pulses are applied to the sampler 152. After further delay of 60° (total 180°) in a delay means 182, they are applied to a sampler 158, and after a still further delay of 60° (total 240°) in the delay means 184, they are applied to the sampler 170.

The purpose of the low-pass filters 132, 150, and 166 at the outputs of each of the cameras 130, 148 and 164 respectively is to prevent the high frequency video signals, lying above the sampling frequency $F_s$, from beating with the sampling frequency so as to produce frequencies within the passband of the transmitter and thus distort the signals of the same frequency that originally lay below the sampling frequency. If the cameras themselves were limited to such an output lower than the sampling frequency, then the separate filters 132, 150, and 166 would not be required.

It will also be apparent to those skilled in the art that the filtering that is done after the sampler could also be done before the sampler. For example, in the green channel, the bandpass filter 142 and its series connected attenuator 144 could be replaced as follows. An adder could be inserted between the attenuator 134 and the sampler 136. A band-pass filter and a series connected attenuator that reduces the signals applied to it by a factor of 6 could be connected between the output of the green camera 130 and the adder. The net attenuation of the band $(F_{co}-F_s)$ to $(2F_s-F_{co})$ from camera to sampler would then be by a factor of 2, while for the remainder of the band the factor would be 3. There are other ways in which the same final results could be effected in other channels as well as in the green channel. Whichever arrangement is employed, however, there is provided means for selecting the proper frequencies in such a way that they can be separately operated on. This is possible because the sampling process never converts a frequency outside the band $(F_{co}-F_s)$ to $(2F_s-F_{co})$ to a frequency within that band, or vice versa.

The following explanation relates to the operation of the transmitter shown in Figure 4. For the purpose of simplicity, the embodiments in the invention shown and discussed in connection with the previous figures in the drawings have not considered the matter of attaining proper signal levels within the different frequency regions of the video spectrum. One reason for this is that the levels can be properly set in the receiver. However, it may be desirable in some circumstances to set these levels in a transmitter such as illustrated in Figure 4. Assume for purposes of discussion that the maximum available amplitude in the output of each of the cameras 130, 148 and 164 has a value of unity. It will be noted that those signal frequencies lying outside the mid-frequency region or the cross-talk region between the lower frequency of $(F_{co}-F_s)$ and the upper frequency of $(2F_s-F_{co})$ are applied to the samplers 136, 152, and 170 after being reduced by factor of 3 in the attenuators 134, 154, and 168 respectively. Analysis of the sharp pulses produced by the pulse generator 178 and applied to the samplers 136, 152, and 170 shows that they may be adequately represented by an expression:

$$(a)\ 1+2\cos.\ \omega_s t$$

Since a sampling process is one of modulation, wherein the frequency $\omega_s$ may be considered to be multiplied or modulated by the video signals, the signal appearing at the output of a sampler such as 136 in the green channel may be represented by an expression:

$$(b)\ \tfrac{1}{3}\ (1+2\cos.\ \omega_s T)\ V\cos.\ \omega t$$

wherein $\omega_s$ represents the sampling frequency and $\omega$ represents the frequency of the video signal. The coefficient ⅓ represents the effect of the attenuators. Expansion of this expression yields the following result:

$$(c)\ \tfrac{1}{3}\ V\cos.\ \omega t+\tfrac{1}{3}\ V\cos.\ (\omega_s-\omega)\ t+\tfrac{1}{3}\ V\cos.\ (\omega_s+\omega)\ t$$

Thus the signal supplied by each of the samplers is comprised of three parts, the first term in the latter expression representing the video signal itself, the second term representing the lower side-band of the sub-carrier $\omega_s$, and the third term representing the upper side-band produced by the modulation of the sub-carrier $\omega_s$. In the mid-frequency or cross-talk region, the upper sideband represented by the third term lies above the cut-off frequency $F_{co}$ of the transmitter 176, and therefore is not available at the receiver. This amounts to a reduction of energy allotted to signals lying within the cross-talk region that is between $(F_{co}-F_s)$ and $(2F_s-F_{co})$ by a factor of 3/2. Therefore, if the signals in this region are to be reproduced at their proper amplitude level, means must be provided for accentuating their amplitude either at the transmitter or at the receiver.

An expression for the required signal may be as follows:

$$(d)\ \tfrac{1}{2}\ V\cos.\ \omega t+V\cos.\ (\omega_s-\omega)\ t$$

The first term of this expression is the video signal itself, the second term is the lower side-band. Each of these must be one-half the total signal if the transmitted signal is to be unity, which was defined previously as being the maximum available amplitude of a particular signal in any one of the color channels.

Figure 4 illustrates a way in which this may be done at the transmitter. Assuming unity signal at the output of the green camera 130, the output of the attenuator 134 is ⅓ unity and therefore the output of the sampler 136 is also ⅓ unity. All signals up to 3.8 megacycles $$(F_s=\omega_s)$$

are applied by the lead 140 to the adder 138 so that the first two terms of the expanded expression:

$$(c)\ \tfrac{1}{3}\ V\cos.\ \omega t+\tfrac{1}{3}\ V\cos.\ (\omega_s-\omega)\ t+\tfrac{1}{3}\ V\cos.\ (\omega_s+\omega)\ t$$

are provided directly to the adder 138. The signals lying in the cross-talk region are such that the signals represented by the first two terms of the Expression *c* are selected by the band-pass filter 142 and further attenuated by a factor of 2 in the attenuator 144 before being again applied to the adder 138. Thus, these signals are applied at ⅙ the maximum available amplitude to the adder 138 via this second path, that may be represented by the expression:

$$(e)\ \tfrac{1}{6}\ V\cos.\ \omega t+\tfrac{1}{6}\ V\cos.\ (\omega_s-\omega)\ t$$

When these signals that come through the band-pass filter 142 and attenuator 144 are added in the adder 138 to the signals supplied to the adder 138 via the lead 140 and represented by the Expression *c*, the result is the required signal as illustrated in the Expression *d*. Here again it must be remembered that the third term of the Expression *c*, although present in the output of the adder 138, is not transmitted by the transmitter 176, when its frequency exceeds $F_{co}$, and therefore it is not available at the receiver.

In the red channel, the video signals that are supplied to the sampler 152 are attenuated by a factor of 3 in the attenuator 154. Due to the action of the low-pass filter 155 and the high-pass filter 156 at the output of the sampler 152, however, no further level correction need be applied to this sampler, since the frequencies in these regions are such that all three terms of the Expression *c* may be transmitted by the transmitter 176. However, the frequencies lying in the cross-talk region that are selected by the band-pass filter 162 from the output of the sampler 158 must have their levels corrected as once again the third term of the Expression *c* is not transmitted by the transmitter 176. Here, the signals are directly attenuated by the attenuator 160 so that they become ½ their original value. Thus, the output of the band-pass filter 162 may be represented by the Expression *d*.

In the blue channel, it is only necessary to reduce the signal by a factor of 3 in the attenuator 168 in order to produce a unity signal, as only those frequencies for which all 3 terms of the Expression *c* may be transmitted are applied to the adder 138 by the combination of the low-pass filter 172 and the high-pass filter 174.

It has previously been stated that the samplers may be gated amplifiers that permit signals applied to them to pass when they are keyed or pulsed. This results in a modulation of the keying pulses. As previously discussed the pulses may be represented by the expression: $1+2\cos.\ \omega_s t$, where $\omega_s$ is the frequency of the pulses. When such a wave is modulated or multiplied by a video signal, the product produced by the first term of the expression and the video signal is the video signal itself. This may be termed the D.-C. modulation product, as it is derived from a modulation of the D.-C. component of the sampling wave. Modulation products produced by the second term of the expression are termed A.-C. modulation products. In all of the arrangements shown, therefore, the samplers could be balanced modulators wherein a sine wave of a frequency equal to $\omega_s$ is modulated by the video signals so as to produce the A.-C. products of modulation, and the video signal itself could be by-passed around the sampler. If the modulator produces any D.-C. products, this can be suitably taken care of by adjusting the amplitude of the D.-C. components going through the by-pass around the sampler. The pulse generators could then be replaced with an oscillator.

This principle of by-passing the video signal so as to produce a final signal having the correct D.-C. products of modulation is illustrated in the transmitter of Figure 3. It will be noted therein that the mid-range frequencies of the blue and green video signals are mixed together and are passed through the green sampler 93 and the blue sampler 88. At the same time, they are by-passed around the samplers via a polarity reverser 94. It was necessary to use a polarity reverser only because the D.-C. products of modulation of the mid-range of frequencies are too large in amplitude as they are produced in two samplers rather than in one. The important fact is that the same frequencies that are applied to the modulating samplers are by-passed around the samplers. It is obvious that this same means for producing the proper relationship between the amplitude of the D.-C. products of modulation and the A.-C. products of modulation could be extended to all frequencies.

Having thus described my invention, what is claimed is:

1. In a transmitter adapted for use in color television, the combination of a first terminal adapted to receive video signals representative of a first color, a second terminal adapted to receive video signals representative of a second color, and a third terminal adapted to receive video signals representative of a third color, a first filter adapted to pass video frequencies lying below a first predetermined frequency connected to said first terminal, a second filter adapted to pass video frequencies lying below said first predetermined frequency connected to said second terminal, a third filter adapted to pass signals lying below a second predetermined frequency, said second predetermined frequency being higher than said first predetermined frequency, a first adder connected between said first and second terminals, a band-pass filter adapted to pass signals lying between said first and second predetermined frequencies coupled to the output of said first adder, a second adder coupled to receive the output of said first filter and said band-pass filter, a third adder adapted to receive the output of said second filter and said band-pass filter, means for sampling the outputs of said second and third adders and said third filter at different phases, a polarity reverser connected to the output of said band-pass filter, and a fourth adder coupled to the outputs of said samplers and of said polarity reverser, whereby to form a composite signal for transmission in a single signal conveying channel.

2. A color television transmitter comprising in combination, means for sampling frequencies of two video signals lying below a first predetermined frequency at different phases with respect to a sampling wave, means for sampling frequencies of a third video signal that lie below a second predetermined frequency, the second predetermined frequency being higher than said first predetermined frequency, the phase of said latter sampling with respect to said sampling wave being in the opposite direction to and midway between the sampling of said first and second video signals, means for combining the frequencies of said first and second signals that lie in the band of frequencies between said first and second predetermined frequencies, a polarity reverser means for applying the band of frequencies so derived to the samples of said first and second video signals and to said polarity reverser, an adder, and means for applying the outputs of all said samplers and said polarity reverser to said adder, whereby to form a composite signal for transmission in a single signal conveying channel.

3. A color television receiver comprising in combination, three samplers to which a received signal is applied, each of said samplers operating at different phases, a polarity reverser to which the received signal is applied, a first adder connected to the output of two of said samplers and said polarity reversing means, a band-pass filter having its lower limit at a predetermined frequency, said band-pass filter being connected to the output of said adder, separate low-pass filters each having an upper limit set at said predetermined frequency connected to the outputs of said two samplers, a second adder connected to receive the output of said band-pass filter and a first one of said low-pass filters, a third adder connected to the output of said band-pass filter and the second one of said low-pass filters, a third low-pass filter having its upper frequency limit set at a higher predetermined frequency connected to the output of the remaining sampler, and means utilizing the outputs of said second and third adders and of said third low-pass filter to reproduce a color image.

4. A television system comprising in combination, first means for successively sampling the low-frequency components of a first number of signals at a given frequency, second means for successively sampling during uniformly spaced intervals within each cycle of said given frequency a mid-frequency range of a second number of said signals that is less than said first number, means for combining all of said sampled signals to form a composite signal, means for detecting said composite signal, third means for sampling at said given frequency the low-frequency portion of said composite signal at different times in a number of different channels equal to said first number, fourth means for sampling the mid-frequency range of said composite signal during uniformly spaced intervals within each cycle of said given frequency in a number of channels equal to said second number, and means utilizing the outputs of said third and fourth sampling means to reproduce a color image.

5. In a receiver, as described in claim 3, a fourth adder connected to the output of said third low-pass filter, and a band-pass filter having lower and upper limits corresponding to said predetermined frequencies, said band-pass filter being connected so as to apply the received signal to said third and fourth adders.

6. Electronic apparatus comprising in combination an input terminal and an output terminal, a modulator coupled between said terminals, and a circuit adapted to by-pass signals around said modulator, said bypass circuit having such frequency characteristics that at least some of the signal frequencies that can pass through it can also pass to the modulator.

7. In a signalling system, the combination of, three sources of signals, separating means coupled to each of said sources for separating signal components having frequencies below a predetermined frequency from signal components having frequencies above a predetermined frequency, means for time division multiplexing said signal components having frequencies below a predetermined frequency in three channels, and means for time division multiplexing the signal components of two of said three signals higher than said predetermined frequency in two signal channels which are equally spaced in time.

8. In a color television transmission system wherein a plurality of signals are transmitted by a subcarrier wave, the combination of, a first source of video signals, a first low pass filter coupled to said first signal source for passing frequency components up to and including a first predetermined frequency, a second source of video signals, a second low pass filter coupled to said second signal source for passing frequency components up to and including a second predetermined frequency lower than said first predetermined frequency, a bandpass filter coupled to said second signal source for passing frequency components having a lower frequency limit equal to said second predetermined frequency and having an upper frequency limit equal to said first predetermined frequency, a third signal source, a third low pass filter coupled to said third signal source for passing frequency components up to and including said second predetermined frequency, means coupled to said first low pass filter, said second low pass filter, and said third low pass filter for generating a subcarrier wave having three uniformly spaced sequentially recurrent components each of which represents one of the signals from said low pass filters for frequency components up to and including said second predetermined frequency and having another uniformly spaced sequentially recurrent component representing signal components between said first predetermined frequency and said second predetermined frequency for signals from said first low pass filter and said bandpass filter only.

9. In a color television transmission system wherein a plurality of signals are transmitted in sequence by a carrier wave, the combination of, a first source of video signals, a first low pass filter coupled to said first source of video signals for passing frequency components up to and including a first predetermined frequency only, a second video signal source, a second low pass filter coupled to said second video signal source for passing frequency components up to and including a second predetermined frequency which is lower than said first predetermined frequency only, a bandpass filter coupled to said second video signal source for passing frequency components between said first predetermined frequency and said second predetermined frequency only, a third video signal, a third low pass filter coupled to said third video signal source for passing frequency components up to and including said second predetermined frequency only, and signal combining means coupled to said first low pass filter, said second low pass filter, said third low pass filter, and said bandpass filter for providing a carrier wave having three equally phased components each of which represents frequency components up to and including said second predetermined frequency of one of said signal sources, and two uniformly phased components representing frequency components between said second predetermined frequency and said first predetermined frequency of two of said signal sources only.

10. In a color television transmission system wherein a plurality of signals are transmitted in sequence by a carrier wave, the combination of, a first source of video signals representing a first chosen primary color, a first low pass filter coupled to said first signal source for passing frequency components up to and including a first predetermined frequency only, a second video signal source representing a second chosen primary color, a second low pass filter coupled to said second video signal source for passing frequency components up to and including a second predetermined frequency only, a bandpass filter coupled to said second video signal source for passing frequency components having a lower limit of a second predetermined frequency lower than said first predetermined frequency and an upper limit equal to said first predetermined frequency, a third video signal source representing a third chosen primary color, a third low pass filter coupled to said third signal source for passing frequency components up to and including said third predetermined frequency only, a four channel time division multiplexer having an output circuit and three channels which are sequentially connected to said output circuit at equal intervals in time and a fourth channel which is connected to said output circuit during an interval in time which is equally spaced between two of said three channels, means coupling each of said low pass filters to one of said three multiplexer channels, and means coupling said bandpass filter to said fourth of said multiplexer channels.

11. In a color television transmission system wherein a plurality of signals are transmitted in sequence by a carrier wave, the combination of, a green video signal source, a red video signal source, and a blue video signal source, means limiting the signal from said green video signal source to frequency components below a first predetermined frequency, means dividing the video signal from said red video signal source into a portion having frequency components below a second predetermined frequency lower than said first predetermined frequency and a portion having frequency components between said second predetermined frequency and said first predetermined frequency, means limiting the signal from said blue video signal source to frequencies below said second predetermined frequency, means time division multiplexing said frequency limited green video signal, said portion of said red video signal below said second predetermined frequency and said frequency limited blue videoe signal in three uniformly spaced sequentially recurrent channels and said portion of said red video signal having frequencies between said second predetermined frequency and said first predetermined frequency in a signal channel which is equally spaced in time between said red video signal channel and said blue video signal channel.

12. In a color television transmission system wherein a plurality of signals are transmitted in sequence by a carrier wave having unequal sidebands, the combination of, a first source of signals representing a chosen color, a second source of signals representing a second chosen color, signal dividing means coupled to said second video signal source for separating signal components having frequencies below a predetermined frequency from signal components having frequencies above a predetermined frequency, a third video signal source frequency limiting means coupled to said third video signal source for passing frequencies below said predetermined frequency only, time division multiplexing means having a first signal channel, a second signal channel, and a third signal channel, each of which is sequentially recurrent and equally spaced in time with respect to the other two signal channels, and a fourth signal channel which is sequentially recurrent and equally spaced in time between said second signal channel and said third signal channel, means coupling said first video signal source to said first signal channel, means coupling said signal dividing means to said second signal channel for frequency components lower than said predetermined frequency only, means coupling said signal dividing means to said fourth signal channel for frequency components higher than said predetermined frequency only, and means coupling said frequency limiting means to said third signal channel.

13. In a color television system wherein a plurality of signals are transmitted by a subcarrier wave, the combination of, a first source of video signals, a first low pass filter coupled to said first video signal source for passing frequency components up to and including a first predetermined frequency, a second source of video signals, a second low pass filter coupled to said second video signal source for passing frequency components up to and including a second predetermined frequency lower than said first predetermined frequency, a bandpass filter coupled to said second signal source for passing frequency components having a lower frequency limit equal to said second predetermined frequency and having an upper frequency limit equal to said first predetermined frequency, a third signal source, a third low pass filter coupled to said third signal source for passing frequency components up to and including said second predetermined frequency, means coupled to said first low pass filter, said second low pass filter, and said third low pass filter for generating a subcarrier wave having three uniformly spaced sequentially recurrent components each of which represents one of the signals from said low pass filters for frequency components up to and including said second predetermined frequency and having another uniformly spaced sequentially recurrent component representing signal components between said first predetermined frequency and said second predetermined frequency for signals from said first low pass filter and said bandpass filter only, means transmitting and receiving said subcarrier wave, means detecting said subcarrier wave, a fourth low pass filter coupled to said detecting means for passing frequency components up to and including said first predetermined frequency, a second bandpass filter coupled to said detecting means for passing frequency components having a lower frequency limit equal to said second predetermined frequency and an upper frequency limit equal to said first predetermined frequency, a fifth low pass filter coupled to said detecting means for passing frequency components up to and including said second predetermined frequency, sampling means coupled to said fourth low pass filter and said fifth low pass filter for sequentially deriving said three uniformly spaced sequentially recurrent components, and sampling means coupled to said bandpass filter for deriving said sequentially recurrent component representing signals from said first low pass filter and said bandpass filter.

14. In a color television system wherein a plurality of signals are transmitted in sequence by a carrier wave, the combination of, a first source of video signals, a first low pass filter coupled to said first source of video signals for passing frequency components up to and including a first predetermined frequency only, a second video signal source, a second low pass filter coupled to said second video signal source for passing frequency components up to and including a second predetermined frequency lower than said first predetermined frequency only, a bandpass filter coupled to said second video signal source for passing frequency components between said first predetermined frequency and said second predetermined frequency only, a third video signal, a third low pass filter coupled to said third video signal source for passing frequency components up to and including said second predetermined frequency only, and signal combining means coupled to said first low pass filter, said second low pass filter, said third low pass filter, and said bandpass filter for providing a carrier wave having three equally phased components each of which represents frequency components up to and including said second predetermined frequency of one of said signal sources, and two uniformly phased components representing frequency components between said second predetermined frequency and said first predetermined frequency of two of said signal sources only, means transmitting and receiving said subcarrier wave, means deriving each of said three equally phased components from said carrier wave, and means deriving said two equally phased components from said carrier wave.

15. In a color television system wherein a plurality of signals are transmitted in sequence by a carrier wave, the combination of, a first source of video signals representing a first chosen primary color, a first low pass filter coupled to said first signal source for passing frequency components up to and including a first predetermined frequency only, a second video signal source representing a second chosen primary color, a second low pass filter coupled to said second video signal source for passing frequency components up to and including a second predetermined frequency only, a bandpass filter coupled to said second video signal source for passing frequency components having a lower limit equal to a second predetermined frequency lower than said first predetermined frequency and an upper limit equal to said first predetermined frequency, a third video signal source representing a third chosen primary color, a third low pass filter coupled to said third signal source for passing frequency components up to and including said third predetermined frequency only, a four channel time division multiplexer having an output circuit and three channels which are sequentially connected to said output circuit at equal intervals in time and a fourth channel which is connected to said output circuit during an interval in time which is equally spaced between two of said three channels, means coupling each of said low pass filters to one of said three multiplexer channels, and means coupling said bandpass filter to said fourth of said multiplexer channels, means transmitting and receiving the signal appearing at the output of said time division multiplexer, means detecting said signal, a sampler having an input circuit and three output circuits which are sequentially connected to said input circuit at equal intervals in time and a fourth output circuit which is connected to said input circuit during an interval in time which is equally spaced in time between two of said three output circuits.

16. In a color television system wherein a plurality of signals are transmitted in sequence by a carrier wave, the combination of, a green video signal source, a red video signal source, and a blue video signal source, means limiting the signal from said green video signal source to frequency components below a first predetermined frequency, means dividing the video signal from said red video signal source into a portion having frequency components below a second predetermined frequency lower than said first predetermined frequency and a portion having frequency components between said second predetermined frequency and said first predetermined frequency, means limiting the signal from said blue video signal source to frequencies below said second predetermined frequency, means time division multiplexing said frequency limited green video signal, said portion of said red video signal below said second predetermined frequency and said frequency limited blue video signal in three uniformly spaced sequentially recurrent channels and said portion of said red video signal having frequencies between said second predetermined frequency and said first predetermined frequency in a signal channel which is equally spaced in time between said red video signal channel and said blue video signal channel to provide a composite signal, means transmitting and receiving said composite signal, means detecting said signal, sampling means coupled to said detecting means for deriving said frequency limited green video signal, said portion of said red video signal below said second predetermined frequency, and said frequency limited blue video signal from said three uniformly spaced sequentially recurrent channels, and means deriving said portion of said red video signal having frequencies between said second predetermined frequency and said second predetermined frequency from said signal channel which is equally spaced in time between said red video signal channel and said blue video signal channel.

17. In a color television transmitter, the combination including: three sources of video signals, each of said signals having low and high frequency portions; means for segregating the low frequency portions and the high frequency portions of each of said video signals; means operating at a given frequency for providing samples of the low frequency portions only of each of said three video signals in a predetermined sequence; means operating at said given frequency for providing samples of the high frequency portions only of two of said video signals at substantially uniformly spaced intervals; and means for combining the samples of said low frequency signal portions and said high frequency signal portions for transmission in a channel having a limited bandwidth so related to said given frequency that samples of the high frequency portions of only two of said video signals may be conveyed without appreciable distortion.

18. In a color television transmitter, the combination including: three sources of video signals, each of said signals having low, intermediate and high frequency portions; means for segregating the low frequency portions and the intermediate frequency portions of each of said video signals; means operating at a given frequency for providing samples of the low frequency portions only of each of said three video signals in a predetermined sequence; means operating at said given frequency for providing samples of the intermediate frequency portions only of two of said video signals at substantially uniformly spaced intervals; means for combining before sampling said high frequency portions of said two video signals; and means for combining the samples of said low frequency signal portions and said intermediate frequency signal portions with said combined high frequency signal portions for transmission in a channel having a limited bandwidth so related to said given frequency that samples of the intermediate frequency portions of only two of said video signals may be conveyed without appreciable distortion.

19. In a color television receiver adapted to reproduce images in color from a received signal including samples of low frequency portions of three color representative video signals and of uniformly spaced samples of high frequency portions of two color representative video signals, the combination including: means for sampling at a given sampling frequency the low frequency portion of said received signal three times during each cycle of said sampling frequency; means for sampling at said sampling frequency the high frequency portion of said received signal twice during each cycle of said sampling frequency at substantially uniformly spaced intervals; and means for utilizing the samples of said low frequency signal portions and said high frequency signal portions for reproducing respectively the large and small color areas of said image.

20. In a television receiver adapted to reproduce images in color from a received signal including samples of low frequency portions of three color representative video signals, of uniformly spaced samples of intermediate frequency portions of two of said video signals, and an unsampled combination of high frequency portions of said two video signals, the combination including: means for sampling at a given sampling frequency the low frequency portion of said received signal three times during each cycle of said sampling frequency; means for sampling an intermediate frequency portion of said received signal twice during each cycle of said sampling frequency at substantially uniformly spaced intervals; means for combining a high frequency portion of said received signal with the outputs of said intermediate frequency sampling means; and means for utilizing said samples of the low and intermediate frequency signal portions and said combined high frequency signal portion for effectively reproducing large areas of said image in three colors, intermediate areas of said image in two colors and small areas of said image in one color.

21. In a television receiver adapted to reproduce images in color from a received signal including samples of low frequency portions of three color representative video signals and of uniformly spaced samples of high frequency portions of two color representative video signals, the combination including: means for sampling at a given sampling frequency the low frequency portion of said received signal three times during each cycle of said sampling frequency so as to produce a first set of modulation products; means for sampling at said sampling frequency the high frequency portion of said received signal twice during each cycle of said sampling frequency at substantially uniformly spaced intervals so as to produce a second set of modulation products; and means for utilizing said two sets of modulation products in such a manner as to reproduce relatively large areas of said image in three colors and relatively small areas of said image in two colors.

22. In a color television transmitter, the combination including: means for sampling at a given sampling frequency a low frequency portion of each of three video signals respectively representative of three different component colors of an image; means for sampling at said given sampling frequency and at uniformly spaced intervals a different frequency portion of two of said three video signals within the same time taken to sample said low frequency portions of each of said three video signals; and means for combining the outputs of said two sampling means into a composite signal for transmission in a channel having a limited bandwidth.

23. In a color television transmitter, the combination including: means for sampling at a given sampling frequency a low frequency portion of each of three video signals respectively representative of three different component colors of an image; means for sampling at said given sampling frequency and at uniformly spaced intervals a different frequency portion of two of said three video signals within the same time taken to sample said low frequency portion of each of said three video signals; video signal means for combining both frequency portions of said two video signals; and means including an adder for combining the outputs of said two sampling means and of said video signal combining means into a composite signal for transmission in a channel having a limited bandwidth.

24. In a color television receiver adapted to reproduce images in color from a received composite signal including a subcarrier wave effectively modulated in phase and amplitude by relatively low frequency trichromatic video signals and effectively modulated in amplitude only by intermediate frequency bichromatic video signals, said composite signal also including relatively high frequency monochromatic video signals, the combination including: means including phase and amplitude responsive apparatus for separately recovering said trichromatic video signals from said received composite signal; means including amplitude responsive apparatus for separately recovering said bichromatic video signals from said received composite signal; means for separately recovering said monochromatic video signals from said received composite signal; and means for utilizing all of said separately recovered video signals to reproduce a color image.

25. In a color television receiver adapted to reproduce images in color from a received composite signal including a subcarrier wave effectively modulated in phase and amplitude by relatively low frequency trichromatic video signals and effectively modulated in amplitude only by relatively high frequency bichromatic video signals, the combination including: means for demodulating said received composite signal effectively at more than two different phase angles to recover said trichromatic video signals from said received composite signal; means for demodulating said received composite signal effectively at two substantially opposite phase angles to recover said bichromatic video signals from said received composite signal; and means for utilizing said recovered video signals to reproduce a color image effectively in three colors for relatively low frequency portions and effectively in two colors for relatively high frequency portions.

26. In a color television receiver adapted to reproduce images in color from a received composite signal including a sub-carrier wave effectively modulated in phase and amplitude by video signals having a first frequency range and effectively modulated in amplitude only by video signals having a second frequency range different from said first frequency range, the combination including: means for demodulating said received composite signal effectively at more than two phase angles to recover from said received composite signal the video signals having said first frequency range; means for demodulating said received composite signal effectively at two substantially opposite phase angles to recover the video signals having said second frequency range; and means for utilizing said recovered video signals to reproduce a color image.

27. In a color television receiver adapted to reproduce images in three different component colors from a received composite signal including a relatively low frequency component comprising a video signal representing three-color image information, an intermediate frequency component comprising a video signal representing two-color image information, at least one of the colors represented by said intermediate frequency component being a combination of two of said image component colors, and a relatively high frequency component comprising a video signal representing one-color image information, said color represented by said relatively high frequency component being a combination of at least two of said image component colors, the combination including: means responsive to said relatively low frequency component for deriving said three-color image information from said received composite signal; means responsive to said intermediate frequency component for deriving said two-color image information from said received composite signal; means responsive to said relatively high frequency component for deriving said one-color image information from said received composite signal; and means utilizing said image informations to reproduce an image in color in which relatively large size areas are represented in three colors, intermediate size areas are represented in two colors, at least one of which is a combination of two of said three image component colors, and relatively small size areas are represented in one color which is a combination of at least two of said three image component colors.

References Cited in the file of this patent

UNITED STATES PATENTS

| | | |
|---|---|---|
| 2,309,506 | Herbst | Jan. 25, 1943 |
| 2,554,693 | Bedford | May 29, 1951 |
| 2,564,419 | Bown | Aug. 14, 1951 |
| 2,580,903 | Evans | Jan. 1, 1952 |
| 2,621,244 | Landon | Dec. 9, 1952 |
| 2,657,253 | Bedford | Oct. 27, 1953 |
| 2,664,462 | Bedford et al. | Dec. 29, 1953 |
| 2,773,929 | Loughlin | Dec. 11, 1956 |
| 2,774,072 | Loughlin | Dec. 11, 1956 |